United States Patent
Griswold et al.

(10) Patent No.: US 7,614,330 B2
(45) Date of Patent: Nov. 10, 2009

(54) RIP FENCE FOR A TABLE SAW

(75) Inventors: Scott Griswold, Deerfield, IL (US); Tam Ramon, Zhejiang (CN); Kenneth N. Svetlik, Schaumburg, IL (US); Mark S. Talesky, Huntley, IL (US); Ravi Voruganti, Barrington, IL (US); Bradley Wolf, Glenview, IL (US)

(73) Assignee: Robert Bosch GmbH, Stuttgart (DE)

( * ) Notice: Subject to any disclaimer, the term of this patent is extended or adjusted under 35 U.S.C. 154(b) by 325 days.

(21) Appl. No.: 11/214,356

(22) Filed: Aug. 29, 2005

(65) Prior Publication Data

US 2006/0065087 A1  Mar. 30, 2006

(51) Int. Cl.
B27B 27/02 (2006.01)
B26D 7/01 (2006.01)
G01B 7/04 (2006.01)

(52) U.S. Cl. .......................... 83/477.2; 83/438; 83/468; 83/522.18; 83/522.19; 33/706

(58) Field of Classification Search .................. 83/13, 83/446, 468.7, 438, 468, 522.19, 522.18, 83/468.1, 522, 467.1; 33/494, 679.1, 640, 33/608, 810, 706, 707, 708; 269/318
See application file for complete search history.

(56) References Cited

U.S. PATENT DOCUMENTS

| | | | |
|---|---|---|---|
| 3,734,151 A * | 5/1973 | Skripsky | 144/286.5 |
| 3,963,279 A | 6/1976 | Eichler | |
| 4,961,269 A | 10/1990 | Luttmer et al. | |
| 4,982,509 A * | 1/1991 | Luttmer et al. | 33/706 |
| 5,327,653 A * | 7/1994 | Pistorius et al. | 33/1 M |
| 5,406,715 A * | 4/1995 | Koizumi et al. | 33/706 |
| 6,576,531 B2 | 6/2003 | Peng et al. | |
| 6,647,847 B2 | 11/2003 | Hewitt et al. | |
| 6,776,076 B2 * | 8/2004 | Salazar | 83/435.14 |
| 6,899,006 B2 * | 5/2005 | Jolkovski | 83/522.18 |
| 6,986,370 B1 | 1/2006 | Schoene et al. | |
| 7,231,858 B2 * | 6/2007 | Oberheim | 83/477.2 |
| 2002/0078810 A1 * | 6/2002 | Talesky et al. | 83/438 |
| 2002/0157515 A1 * | 10/2002 | Dick | 83/438 |
| 2004/0060411 A1 | 4/2004 | Svetlik | |

FOREIGN PATENT DOCUMENTS

DE  196 37 170 A1  3/1998
GB  2359040 A  8/2001

* cited by examiner

Primary Examiner—Ghassem Alie
(74) Attorney, Agent, or Firm—Greer, Burns & Crain, Ltd.

(57) ABSTRACT

A power table saw of the type which has a generally rectangular table with front and rear end portions, a motor operatively coupled to drive a rotary cutting blade extending upwardly through a top of the table, the table saw including an elongated fence having front and rear end portions, and being configured to be laterally movable along the width of the table and be secured to the front and rear end portions of the table, front and rear releasable locking mechanisms operatively associated with the front and rear end portions of the fence for locking each end portion to the end portions of the table, and at least one positional sensor provided with each of the front and rear end portions of the fence for determining the lateral position of each end portion of the fence along the width of the table.

9 Claims, 10 Drawing Sheets

RIP FENCE FOR A TABLE SAW

BACKGROUND OF THE INVENTION

Table saws are valuable tools used for a variety of tasks, such as cross-cutting wood and plastic, and ripping long boards into narrow strips. While there are a variety of table saw designs, most table saws include a circular saw blade mounted on an arbor that is turned by one or more belts that are driven by a motor. The saw blade extends through an opening in the surface of a saw table, on which surface the workpiece rests and is supported. The depth of cut is varied by adjusting the amount of the blade that extends above the table surface such that the higher the blade extends above the table, the deeper the cut that is made in the material. Angle of the cut with respect to the table surface is typically controlled by adjusting the angle of the arbor to which the blade is affixed.

Additionally, table saws nearly always include a fence or guide that extends from a side of the table nearest the operator to a side furthest from the operator, and is oriented to be generally parallel to a cutting plane of the blade. The rip fence is used to guide the workpiece during the process of making a "rip cut," which is a cut made parallel to a grain of the wood, and guides the workpiece as the workpiece is fed onto the saw blade. A distance of the fence from the blade may be adjusted, thereby determining a location of the cutting surface on the workpiece. Accurate and precise positioning of the workpiece is important to accurate and precision cutting tasks.

However, while conventional rip fences provide some adjustability with respect to a distance at which it is disposed from a cutting plane of the saw blade, the parallelism of the rip fence with the cutting plane of the saw blade can sometimes be compromised depending upon the particular design of the rip fence mechanism. Unfortunately, lack of parallelism or "trueness" not only accounts for inaccurate and imprecise cutting, it may result in a flawed workpiece that exhibits "burning" as the saw blade cuts at an unintended angle. Moreover, lack of parallelism may also result in a dangerous condition wherein the workpiece is kicked back toward the tool operator.

Accordingly, precision alignment of the fence and its parallelism with the cutting plane of the saw blade are of critical importance in making precise and accurate cuts in the workpiece.

SUMMARY OF THE INVENTION

The instant invention includes various embodiments of a device and method for promoting parallelism, or "trueness," between a plane of a rotary cutting blade that is at a right angle to a surface of a table and a rip fence of a table saw assembly. Specifically, embodiments of the invention include a rip fence that may be zeroed at a predetermined location, such as when near or in abutment with the rotary cutting blade, and then moved away from the rotary cutting blade for a predetermined distance such that the distance from a cuffing surface of the rotary cutting blade as well as its orientation with respect to the rotary cutting blade may be determined. Preferably, a front and a rear end of the rip fence include a mechanism whereby the respective distances from the rotary cutting blade may be determined, and that even minute differences in the respective distances may be reconciled to promote trueness between the rip fence and the cutting surface of the rotary cutting blade.

DETAILED DESCRIPTION OF THE INVENTION

Figure 1:
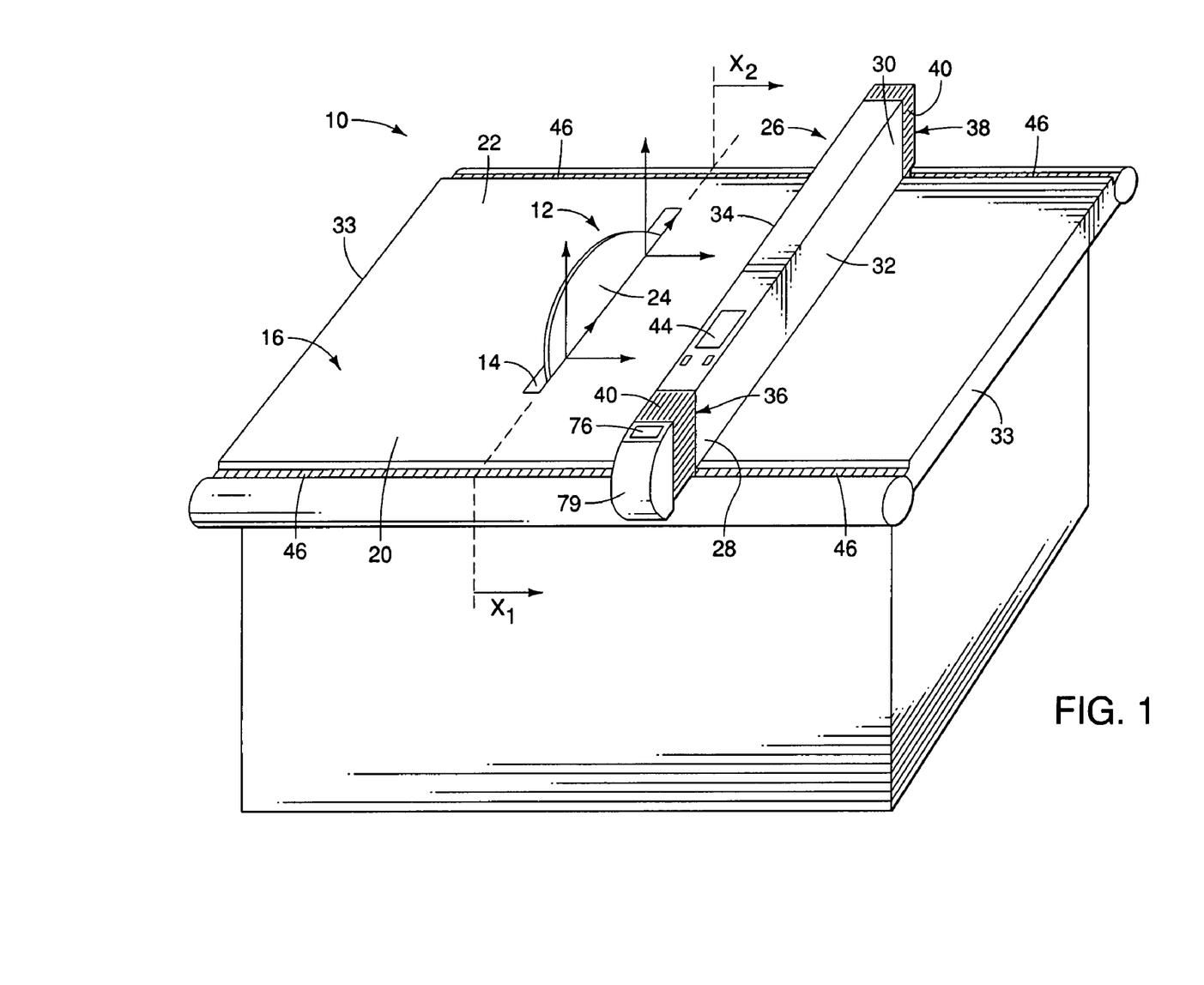
FIG. 1 is a front perspective view of a table saw, rip fence, and front and rear sensor assemblies according to a preferred embodiment of the invention.

While it is contemplated that the invention may be used with a variety of conventional table saw assemblies, such as those manufactured under the SKIL and BOSCH brands by the S-B Power Tool Corporation of Chicago, Ill., one exemplary table saw assembly, indicated generally at 10, is illustrated in FIG. 1 in connection with a first embodiment of the invention. According to the embodiment illustrated in FIG. 1, a rotary cutting blade 12 extends upwardly through a blade bracket 14, which is an elongated slot disposed in a generally middle portion of a table 16. A pair of miter gauge slots 18 (best shown in FIG. 2) are also preferably provided, one on each side of the blade bracket 14, and extending from a front end 20 of the table 16 to a rear end 22 of the table. While the rotary cutting blade 12 may be tiltable for miter cutting, a radial plane 24 of the rotary cutting blade 12 generally extends perpendicularly with respect to a plane of the table.

An elongated, generally rectangular rip fence, indicated generally at 26, is also provided with the exemplary table saw assembly 10, wherein the rip fence has a length corresponding generally to a length of the table 16, which is defined as a depth of the table as measured from the front end 20 to the rear end 22 of the table. The rip fence 26 is configured to be slidable with respect to a top surface of the table 16. Thus, the rip fence 26 has a front end 28 that engages the front end 20 of the table 16 and a rear end 30 that engages a rear end 22 of the table and has an elongated rectangular body 32. The rip fence 26 can move along a width of the table between the rotary cutting blade 12 and a predetermined location on the table, where the width of the table is defined as extending between side ends 33. A guide plane 34 of the rip fence 26 is configured and arranged to face the blade bracket 14.

This embodiment contemplates that the table 16 and the rip fence 26 include complementary measurement mechanisms whereby a distance from the radial plane 24 of the rotary cutting blade 12 to a predetermined location on the table may be accurately and precisely measured, and whereby parallelism between the radial plane and the rip fence 26 may be accurately and precisely ascertained to promote accurate and precise cutting. Specifically, it is contemplated that the rip fence 26 may include one or more of a plurality of positional sensing mechanisms for sensing and/or displaying a location of the rip fence 26 relative to a predetermined reference point, such as the rotary cutting blade 12. The sensing mechanisms may include, but should not be construed as being limited to, electronic sensors, digital readouts, pointers, or measurement indicia such as scoring or other markings disposed on the rip fence 26, preferably at the front and rear ends 28, 30. Similarly, it is contemplated that the table 16 includes corresponding positional sensing indicators for detecting a position of the rip fence 26, such as electronic indicators, digital readouts, pointers or measurement indicia to reference or communicate with the rip fence to give visual or other indication to an operator as to the position of the rip fence relative to the blade.

For example, turning again to FIG. 1, the rip fence 26 according to the preferred embodiment includes a front sensor assembly, indicated generally at 36, and a rear sensor assembly, indicated generally at 38, each of which preferably includes a positional sensor 40. At least one LCD screen 44 is preferably provided to indicate a variety of parameters, such as displacement of the rip fence 26 from the rotary cutting blade 12 and the parallelism of the rip fence to the rotary cutting blade. The positional sensors 40 may be one of a plurality of mechanisms, such as an optical reflective reader, a capacitor, a magnet, or a pointing device, to name a few.

FIG. 1 illustrates the front and rear positional sensors 40 to be optical reflective readers. The table 16 correspondingly includes positional indicators, such as a plurality of sensor reference points 46, which may be sensed by the respective positional sensors 40. Sensor reference points 46 may include one of a plurality of mechanisms, such as a strip of electrical contacts to be read by the positional sensors 40, magnets, a series of bar codes disposed at predetermined increments (e.g., $1/64$"), or contrasting stripes to be read by an optical reflective reader, to name a few.

As illustrated in FIG. 1, the sensor reference points 46 include a strip having a plurality of contrasting stripes, wherein the stripes have a predetermined width, preferably $1/16$". A predetermined number of sensors disposed within each of the contrasting stripes, preferably four, electronically divide the contrasting stripes, thereby rendering an enhanced resolution. For example, where four sensors are included in each of the contrasting stripes gives a resolution of $1/64$".

Figure 2:
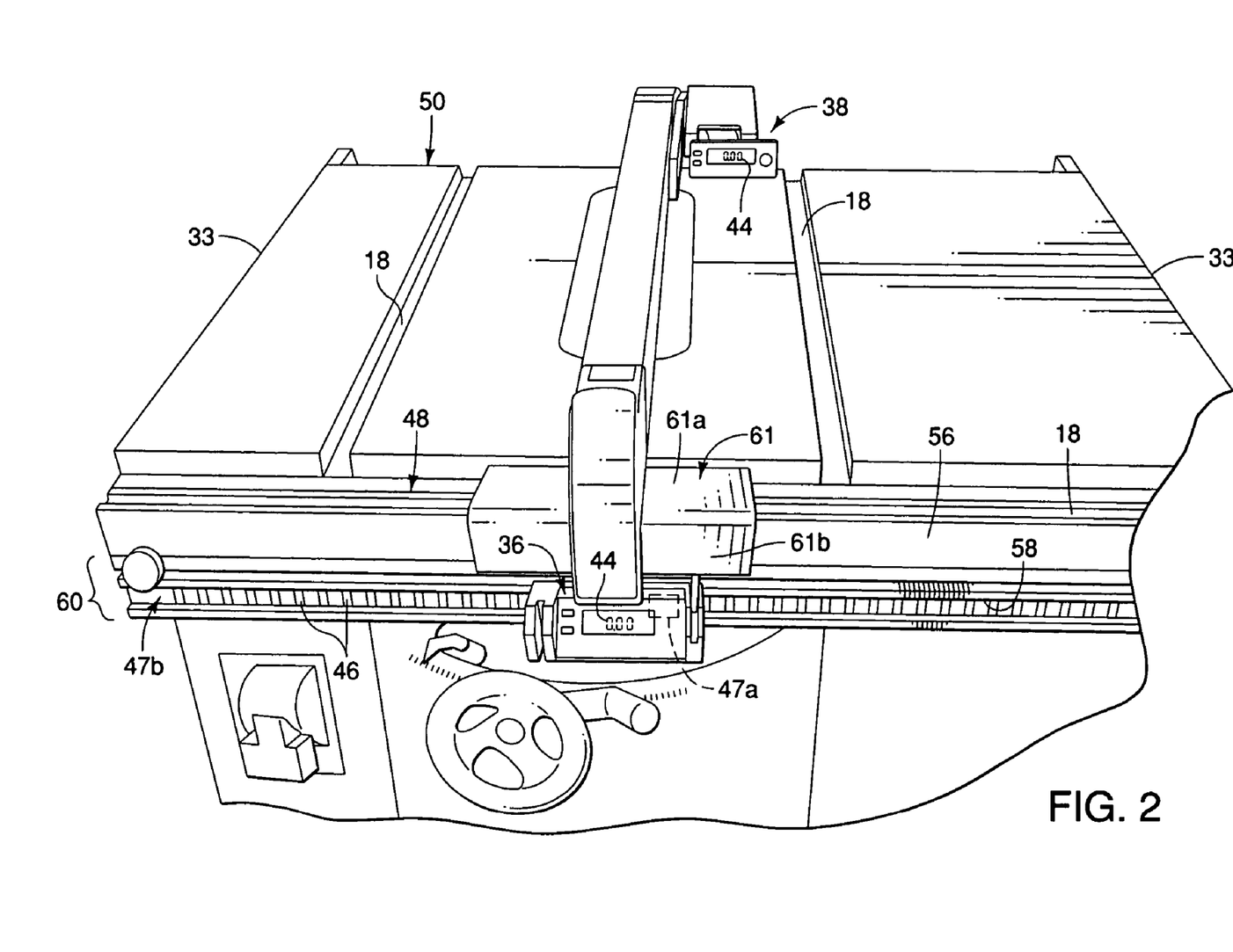
FIG. 2 is a front perspective view of a table saw and rip fence according to another embodiment of the invention.

In contrast, FIG. 2 illustrates another embodiment according to the invention whereby the positional sensors include positional transducer sensing head 47a and interacting strip 47b, which may be optical, mechanical magnetic or capacitive, to name a few. Alternatively, a string driven positional transducer (not shown) may also be used. For example, a capacitive-based interacting strip would have a series of copper pads at equal intervals such as $1/8$" shown as item 46 on item 47b.

The table 16 also preferably includes structural features that promote sliding of the rip fence 26 along the surface of the table 16. These features are commonly known in the art, and include rails on which the fence can slide. Depending on the particular embodiment, additional structural features may be provided to promote sliding of the positional sensors 40 with the rip fence 26.

For example, turning again to the embodiment illustrated in FIGS. 2-5, the table 16 may also include front and rear sliding brackets 48, 50, one at each of the respective front and rear ends 20, 22 along the width of the table as measured from between the sides 33 of the table, for purposes of convention. Depending on the particular sensor assembly used with the table, the sliding brackets 48, 50 may assume a variety of configurations. The front and rear sensor assemblies 36, 38 are operatively coupled to the rip fence 26, and reciprocate along the respective front and rear sliding brackets 48, 50 when the rip fence is moved.

Figure 3:
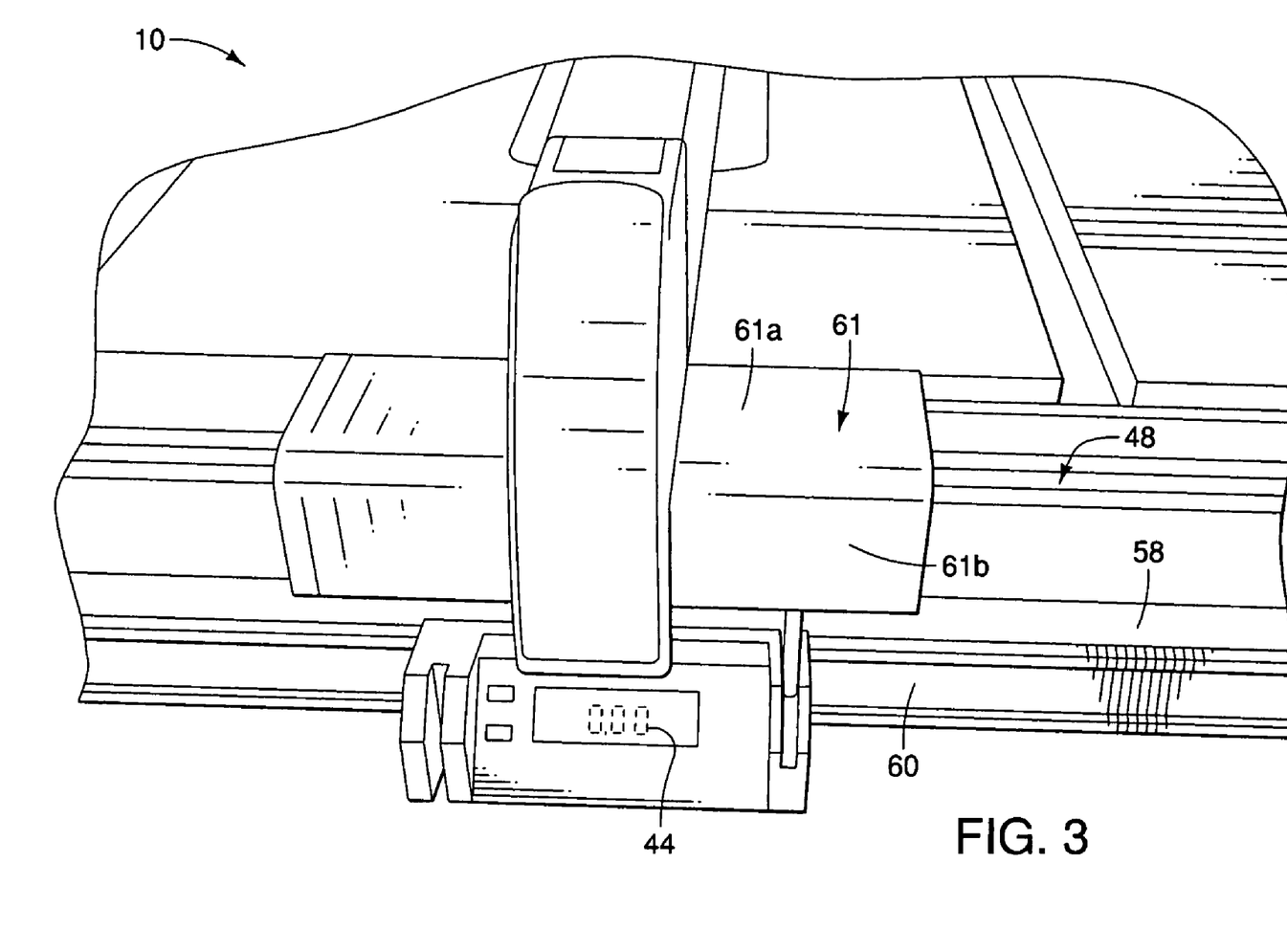
FIG. 3 is a side perspective view of a front sensor assembly illustrated in FIG. 2.

Turning to the front sliding bracket 48 of the embodiment illustrated in FIGS. 2 and 3, the front sliding bracket is generally rectangular in shape, having a length extending between sides 33 of the table 16, with an outside surface 56 including a longitudinal slot 58 therein. A lower portion 60 of the front sliding bracket 48 depends downwardly from a top surface of the table 16, and the front sensor assembly 36 is coupled to the lower portion of the front sliding bracket 48 such that the front sensor assembly is lower than the top surface of the table 16, while the rip fence 26 is coupled to an upper portion of the front sliding bracket, thereby operatively coupling the rip fence and the front sensor assembly. Thus, the front sensor assembly 36 moves along the longitudinal slot 58 as the rip fence 26 moves along a surface of the table 16.

A front mounting bracket, designated generally at 61, is preferably provided to couple the rip fence 26 to the front sliding bracket 48. The front mounting bracket 61 includes a generally horizontal portion 61a and a generally vertical portion 61b disposed at right angles to one another to receive the generally rectangular sliding bracket 48 therein. The front mounting bracket 61 is thereby operably coupled to both the rip fence 26 and the sliding bracket 48, and may slidably engage the sliding bracket to promote movement of the rip fence along the width of the table 16.

Figure 4:
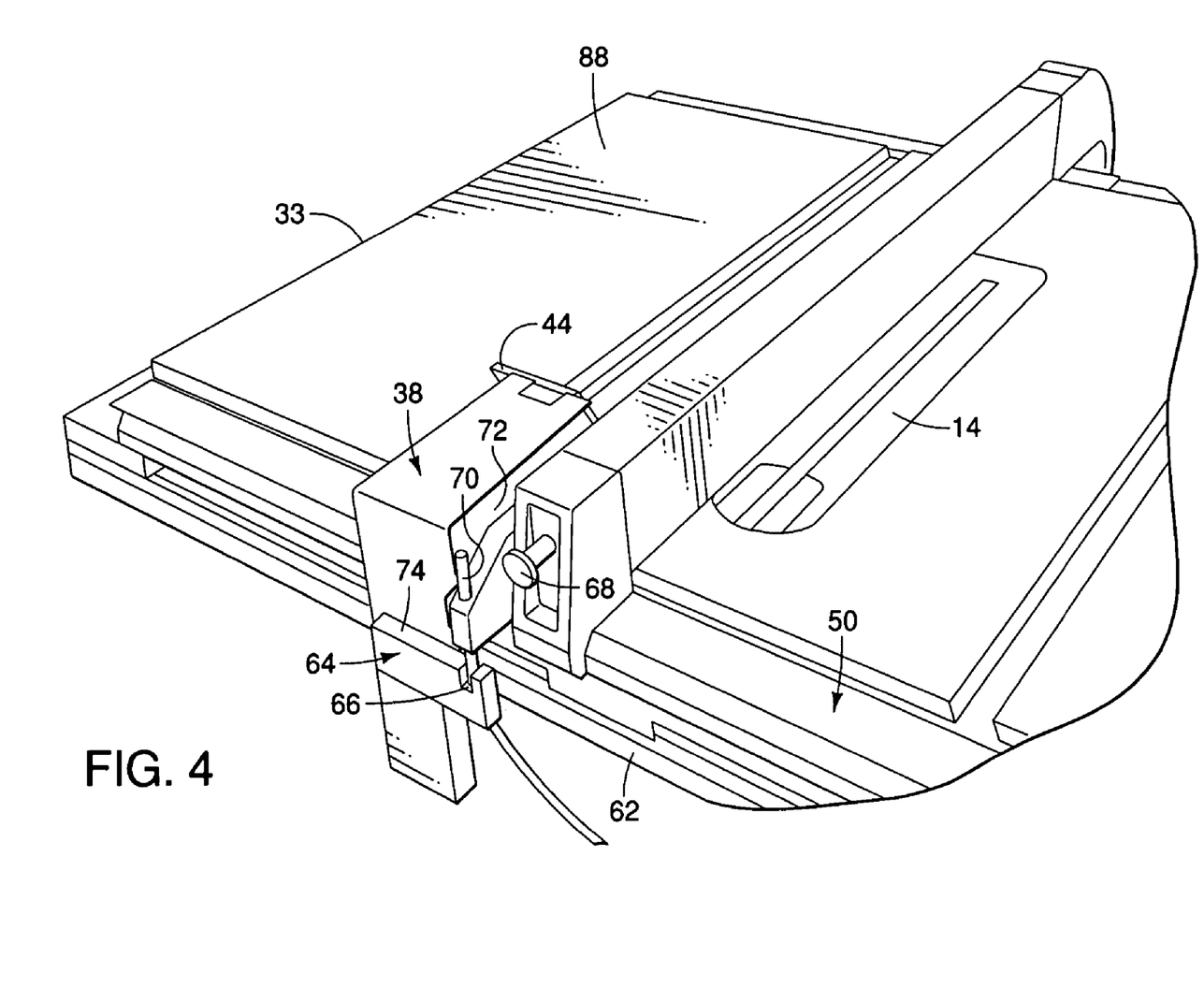
FIG. 4 is a rear perspective view of a table saw, rip fence and rear sensor assembly according to the embodiment illustrated in FIG. 2.
Figure 5:
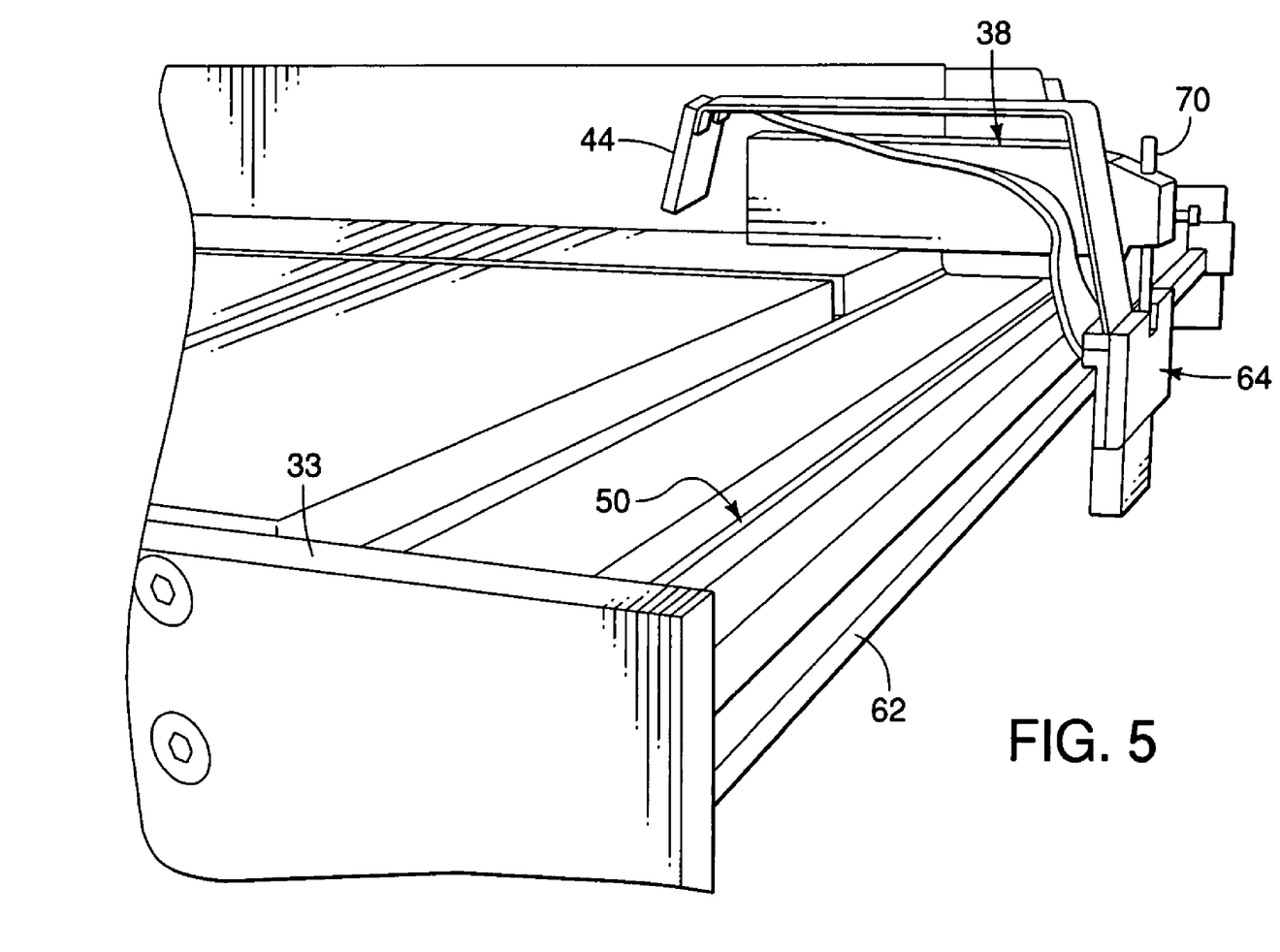
FIG. 5 is a side perspective view of the table saw, rip fence and rear sensor assembly illustrated in FIG. 2.
Figure 6:
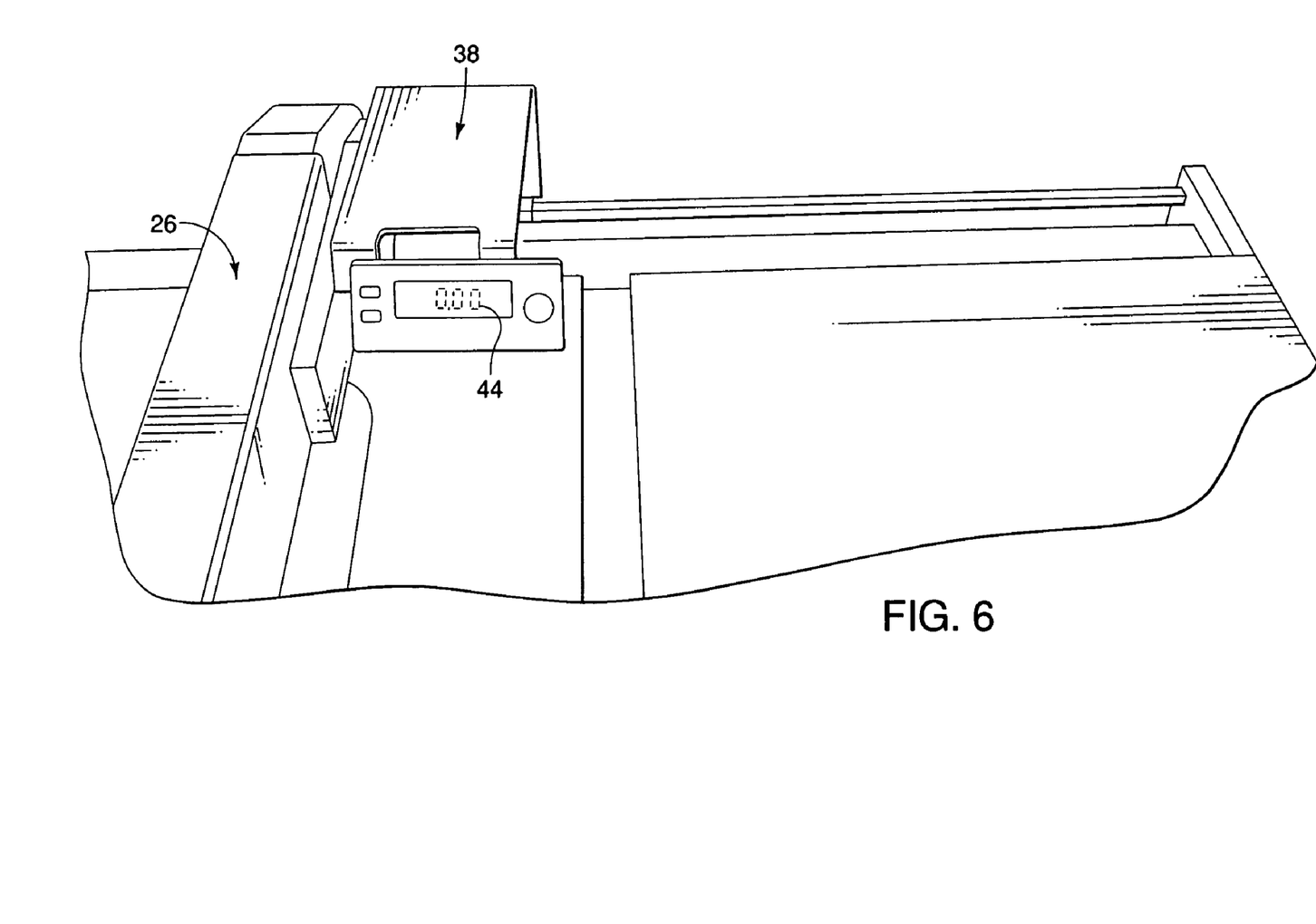
FIG. 6 is a front perspective view of the rear sensor assembly according to FIG. 2.

Similarly, the rear sensor assembly 38, which is best illustrated in FIGS. 4 and 5, is also operatively coupled to the rip fence 26 such that as the rip fence moves, the rear sensor assembly moves. Specifically, the rear sliding bracket 50 (best shown in FIGS. 4 and 5) includes a sliding rail 62 that is coupled to an extreme rear end 22 of the table 16 and is vertically displaced from the top surface of the table to be elevationally lower than the top surface of the table. A mounting bracket 64 is mounted to the sliding rail 62 and configured to be slidingly engaged thereto.

The mounting bracket 64 is preferably generally rectangular in shape, with a longitudinal groove 66 extending along a top portion thereof. The rip fence 26 is mounted to the mounting bracket 64, preferably via a mounting extension 68 having a downwardly depending fastening element 70, such as a pin, configured to lockingly engage the longitudinal groove 66. Similarly, the rear sensor assembly 38 is coupled to the mounting extension 68 on a mounting side 72 thereof, and a lower rear end portion 74 is lockingly engaged to the mounting bracket 64.

Thus, the rear sensor assembly 38 is operably coupled to both the rip fence 26 and the mounting bracket 64 such that the rear sensor assembly moves with the rip fence as it moves. The positional sensor 40 is disposed at a right hand side of the rear sensor assembly 38 as viewed in FIG. 4.

In the preferred embodiment illustrated in FIG. 1, a single LCD screen 44 is configured and arranged on a top surface of the rip fence 26, whereas in alternative embodiments, LCD screens 44 may be disposed at each of the front and rear sensor assemblies 36, 38. As illustrated in FIGS. 2 and 3, where LCD screens are provided on each of the front and rear sensor assemblies 36, 38, the LCD screens preferably face the front end of the table for easy reading by the operator.

Thus, in operation of any of the embodiments, the rip fence 26 is brought into abutment with the radial plane 24 or other predetermined position, at which point the sensors are zeroed by activating a zeroing mechanism 76 disposed on the rip fence. The operator may then move the rip fence 26 to a predetermined location at a desired distance from the rotary cutting blade 12, and may determine the distance from the blade by reading the one or more LCD screens 44 disposed within the front and rear sensor assemblies 36, 38, or within the rip fence 26 itself. The distance of the rip fence 26 from the rotary cutting blade 12 is an average of the respective distances of each of the positional sensors 40, which may be expressed as follows: $(x_1+x_2)/2$, where $x_1$ is a displacement of a first positional sensor and $x_2$ is a displacement of a second positional sensor.

Parallelism, on the other hand, may be determined by the absolute value of the difference between $x_1$ and $x_2$ as follows: $|x_1-x_2|$. Once the operator knows the parallelism, the operator may readjust the fence to resolve any discrepancy such that the absolute value of the difference between $x_1$ and $x_2$ approaches zero, indicating parallelism of the rip fence 26 with the rotary cutting blade 12. A locking mechanism, such as a clamping lever 79 disposed at the front end 28 of the rip fence 26, may then be pivoted into a locking position to lock the rip fence into position.

Figure 7:
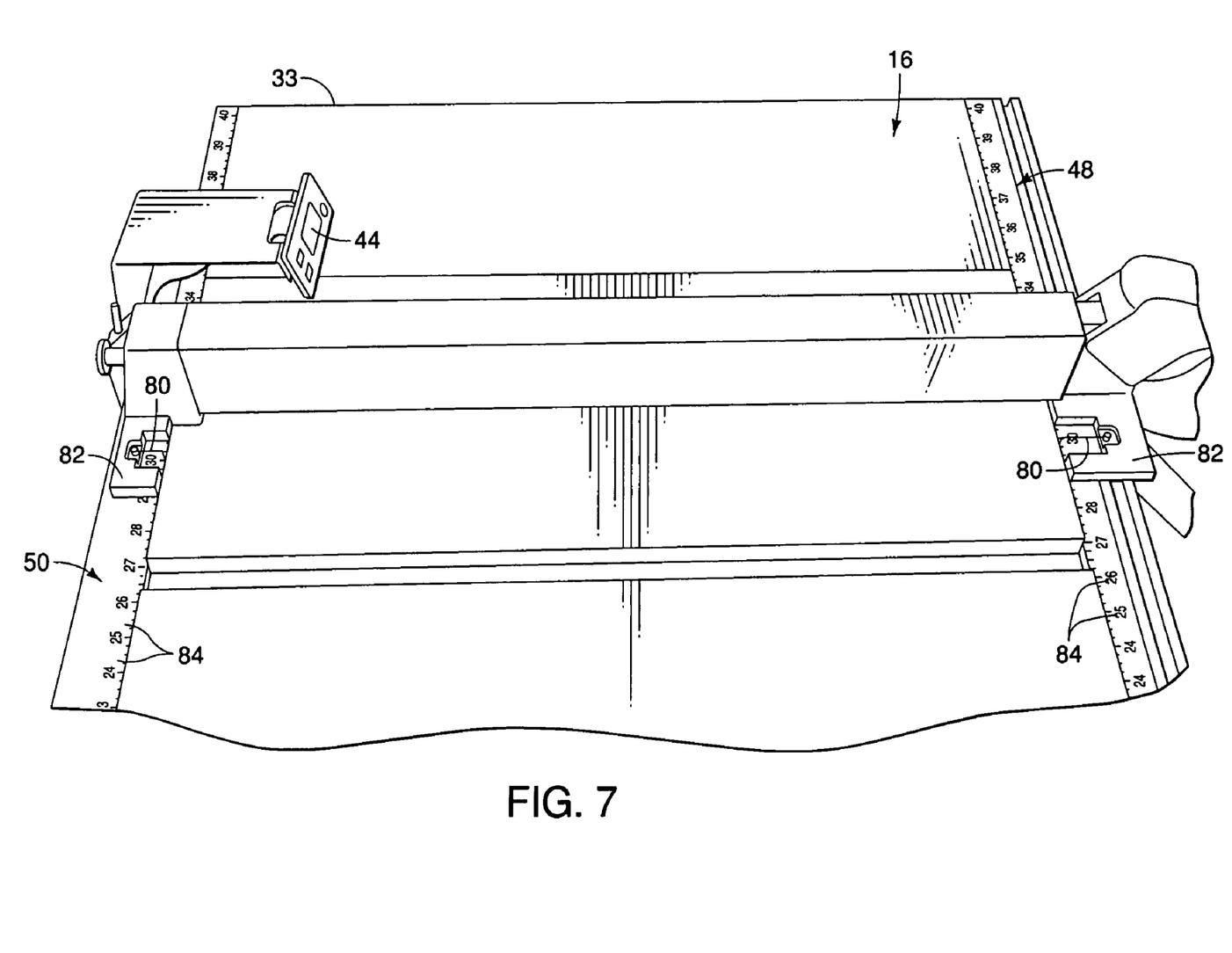
FIG. 7 is a front perspective view of a table saw, rip fence, and front and rear sensor assemblies according to an alternate embodiment of the invention.
Figure 8:
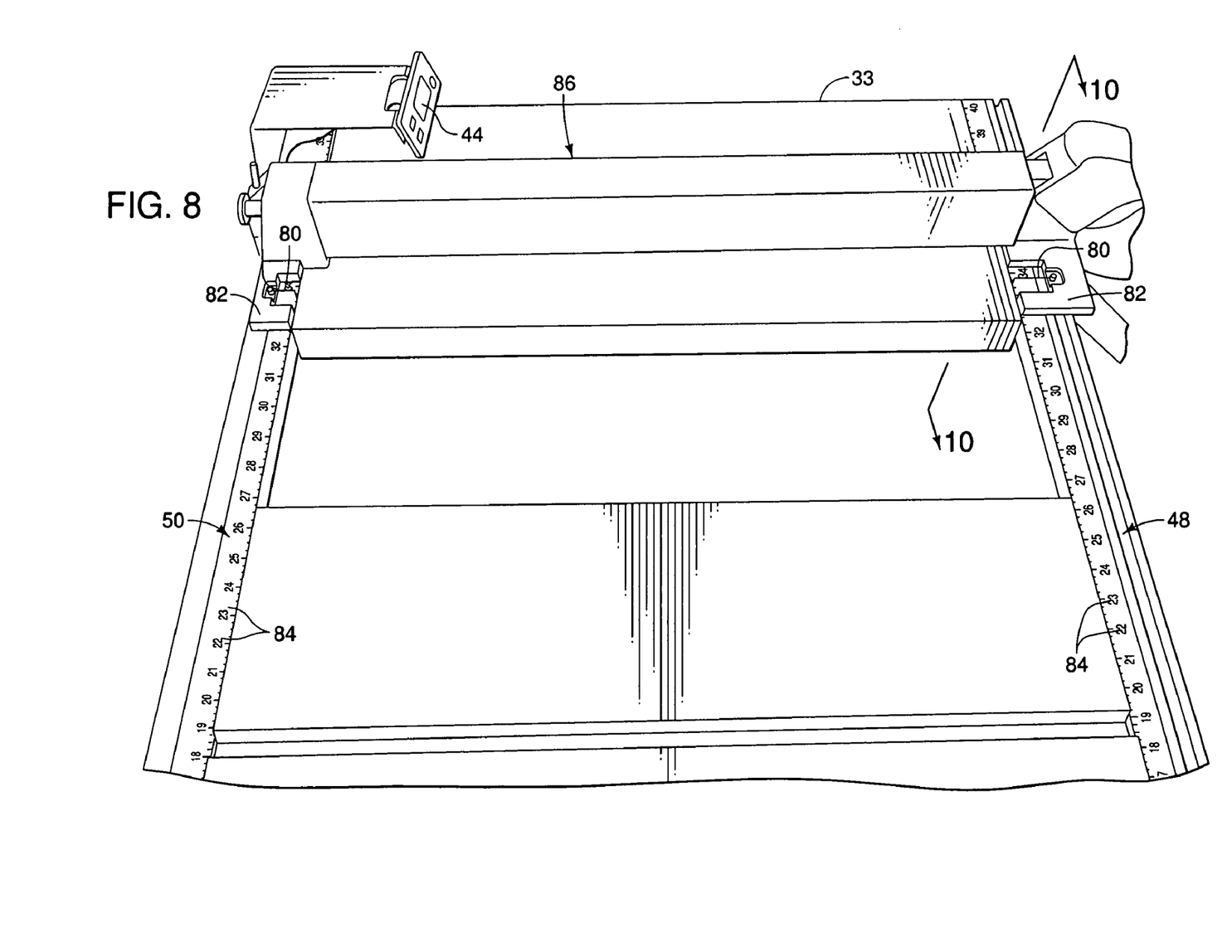
FIG. 8 is a front perspective view of a table saw and rip fence according to another embodiment of the invention.

FIG. 7 illustrates yet another embodiment of the invention that includes a rip fence 26 wherein the positional sensors 40 consist of physical indicators, such as pointers 80 disposed at each end of a mounting bracket 82 coupled to the rip fence. Correspondingly, top surfaces of the sliding brackets 48, 50 include measurement indicia 84 at predetermined increments. The measurement indicia 84 on each of the respective sliding brackets 48, 50 are calibrated with one another such that corresponding measurements oppose one another across the table from a front end 20 to a rear end 22. Thus, as the rip fence 26 is moved away from the rotary cutting blade 12, the pointers 80 will point to a specific measurement such that the operator can readjust and reposition the rip fence until each respective pointer is pointing at the same measurement, indicating a common distance from the radial plane 24 by front and rear ends 28, 30 of the rip fence, thereby indicating parallelism.

Figure 9:
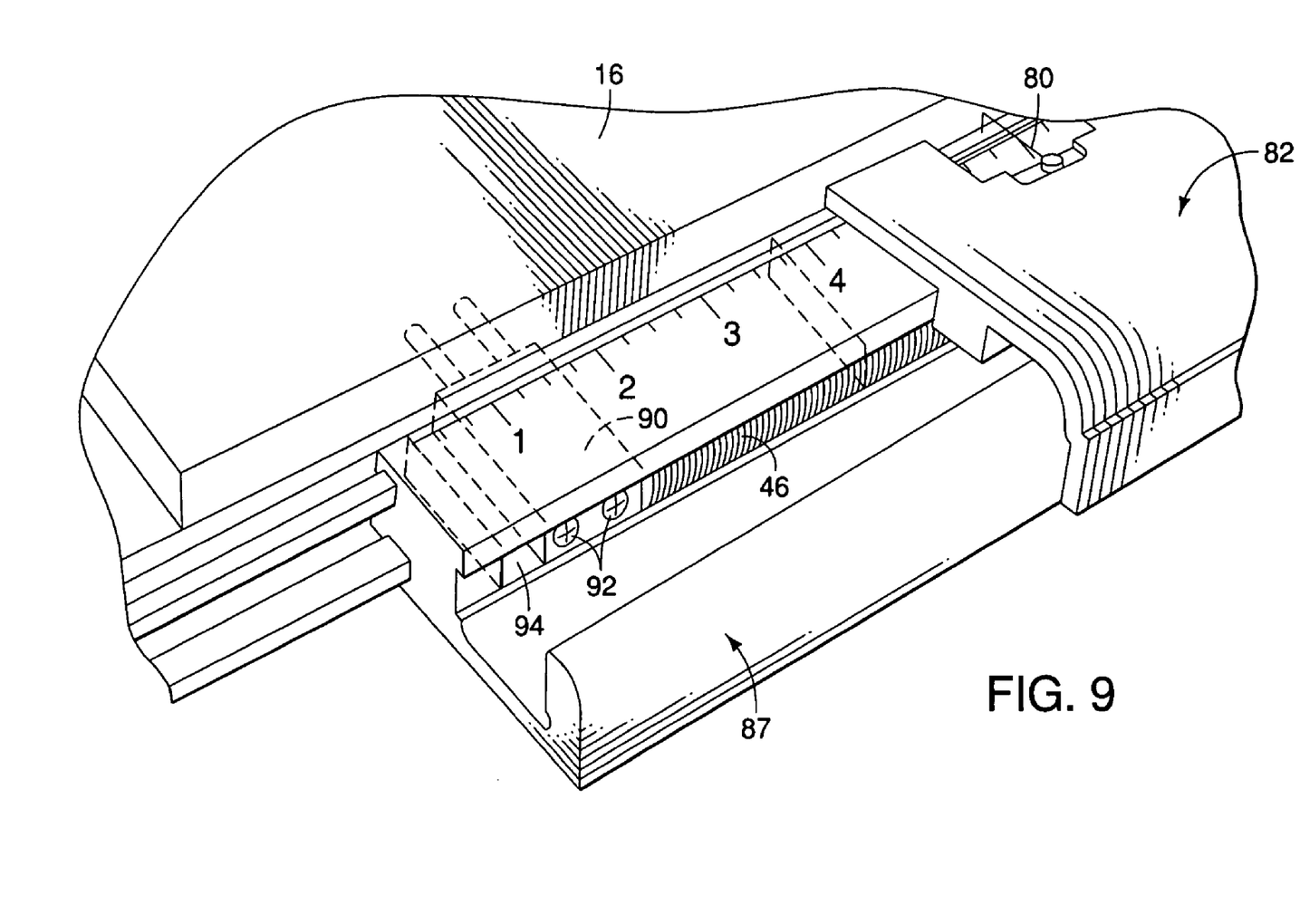
FIG. 9 is a side perspective view of the front sensor assembly of the embodiment illustrated in FIG. 8.
Figure 10:
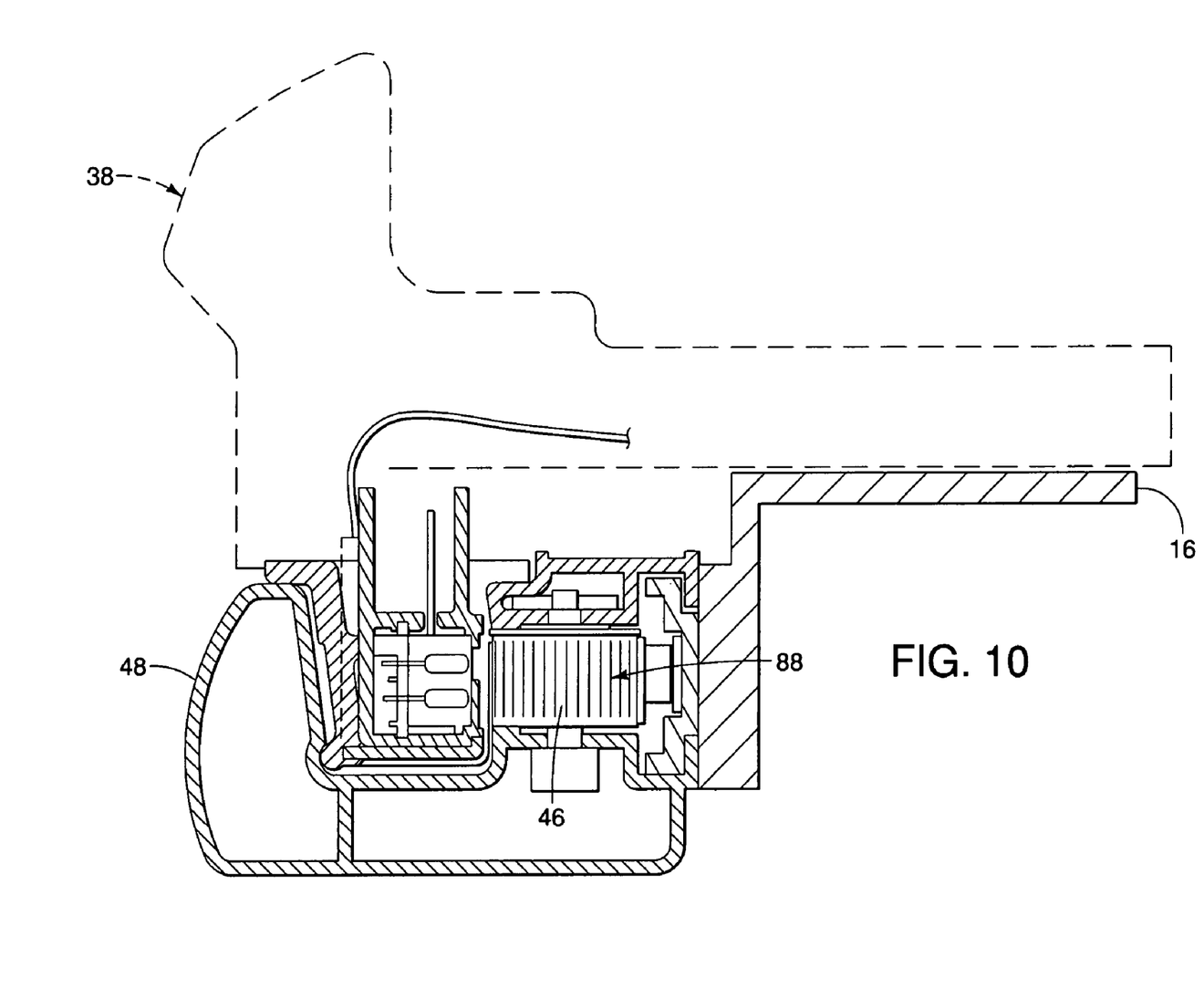
FIG. 10 is a side sectional view of the table saw and rip fence illustrated in FIG. 8.

Turning now to FIGS. 9-10, to promote a greater range of motion for the rip fence 26, some table saws also include a side extension 86 that is configured to be extendable in a direction of the right side 54 of the table 16. More specifically, the side extension 86 is typically a slideable panel that is coupled to the table 16 via one or more rails 87. While it is possible to have the side extension 86 slide relative to the rails (not shown) via a coupling mechanism disposed on an underside of the slide extension, it is also plausible that the rails themselves slideably and telescopically extend from the table 16 to thereby move the side extension. Irrespective of the manner in which it extends, the side extension 86 provides for a predetermined length of extra movement of the rip fence 26.

For example, typically the distance from the radial plane 24 and the guide plane 34 of the rip fence 26 reaches a maximum at a predetermined location toward the right end 54 of the table 16, such as between approximately 13 and 18 inches, with restriction placed on further movement by a hard stop (not shown) disposed at the right end 33 of the table, which abuts a right end of the sliding brackets 48, 50, as well as by a partial length of the sliding brackets themselves, wherein a right side of each abuts the hard stop. Accordingly, the side extension 86 provides for a predetermined increment of extra movement, such as between approximately 11 and 20 inches.

In operation, the operator would slide the rip fence 26 to an extreme rightward position, at which point the operator would extend the slide extension 86 away from the table 16 to provide for an additional length of movement. However, because the rip fence 26 is no longer moving relative to the table 16 as the slide extension 86 is moved, additional provision is optionally contemplated by the invention to promote continued measurement of both the displacement and parallelism of the rip fence.

Any one of a plurality of mechanisms is contemplated by the invention to address parallelism and distance in table saw assemblies 10 that include the slide extension 86. For example, spooled measuring devices 88, such as tape measures, may be provided, with a spindle thereof coupled to the table 16 at a the front and rear ends 20, 22, and a leading end of a tape coupled to the side extension 86 at front and rear ends such that as the side extension is moved, the tape would uncoil to indicate the additional displacement on either side. A disparity in the displacement would indicate a lack of parallelism, which may then be corrected by the operator.

As illustrated in FIG. 9 for example, the spooled measuring device 88 is preferably coupled to the table 16 such that it spools out the measuring tape as the sliding rail 87 moves relative to the table. More particularly, the spooled measuring device 88 is preferably coupled to the table 16 via fasteners, preferably bolts 92, where the bolts extend through a length of the mounting block and into the table 16 to secure the mounting block and spooled measuring device to the table. A slot 94 is provided in the sliding rail 87 such that sliding rail may move relative to the stationary mounting block 90 for a predetermined distance, as a corresponding amount of measuring tape is spooled out from the spooled measuring device 88.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. A power table saw of the type which has a generally rectangular table with front and rear end portions, a motor operatively coupled to drive a rotary cutting blade extending upwardly through a top of the table, said table saw comprising:
    an elongated fence having front and rear end portions, and being configured to be laterally movable along the width of the table and be secured to the front and rear end portions of the table;
    front and rear releasable locking mechanisms operatively associated with said front and rear end portions of said fence for locking each end portion to the end portions of the table;
    at least one positional sensor having an optical reflective reader provided with each of said front and rear end portions of said fence for determining the lateral position of each end portion of said fence along the width of the table; and
    at least one display screen for digitally displaying relative positions of each of said front and rear end portions to thereby display the distance of each end of the fence relative to a reference position and to indicate parallelism of said fence relative to the plane of the cutting blade when the difference between the two distances is zero.

2. The power table saw of claim 1 further comprising a plurality of positional indicators disposed along a width of the table toward the front and rear portions of the table, said positional indicators being configured and arranged to operatively engage said at least one positional sensor.

3. The power table saw of claim 2 further comprising front and rear positional sensors respectively provided with said front and rear end portions of the elongated fence.

4. The power table saw of claim 2 wherein said plurality of positional indicators comprise a plurality of contrasting strips that may be sensed by said optical sensors.

5. The power table saw of claim 2 wherein said positional sensors comprise capacitors and said plurality of positional indicators comprise a strip of electrical contacts spaced at predetermined intervals.

6. The power table saw of claim 1 further comprising a sliding rail coupled to said table and being slidably moveable therewith, and spooled measuring device coupled to said table and being configured to spool out a strip of said positional indicators as said sliding rail moves relative to said table.

7. The power table saw of claim 2 wherein said positional sensors comprise pointing devices and said plurality of positional indicators comprise measurement indicia.

8. A power table saw of the type which has a generally rectangular table with front and rear end portions, a motor operatively coupled to drive a rotary cutting blade extending upwardly through a top of the table, said table saw comprising:

an elongated fence having front and rear end portions, and being configured to be laterally movable alone the width of the table and be secured to the front and rear end portions of the table;

front and rear releasable locking mechanisms operatively associated with said front and rear end portions of said fence for locking each end portion to the end portions of the table;

a plurality of positional indicators disposed along a width of the table toward the front and rear portions of the table, said positional indicators being configured and arranged to be operatively engaged by one or more positional sensors;

a plurality of positional sensors provided with each of said front and rear end portions of said fence for determining the lateral position of each end portion of said fence along the width of the table, wherein said positional sensors comprise an optical reflective reader and said plurality of positional indicators comprise a plurality of contrasting stripes that may be sensed by said optical sensors, wherein each of said plurality of contrasting stripes have a predetermined width, said plurality of positional sensors being disposed within each of the contrasting stripes, to electronically divide the contrasting stripes and render an enhanced resolution of measurement;

at least one display screen for digitally displaying relative positions of each of said front and rear end portions to thereby display the distance of each end of the fence relative to a reference position and to indicate parallelism of said fence relative to the plane of the cutting blade when the difference between the two distances is zero.

9. A power table saw as defined in claim 8 wherein said plurality of positional sensors comprise four positional sensors.

* * * * *